(12) United States Patent
Rajendran et al.

(10) Patent No.: US 11,702,804 B2
(45) Date of Patent: Jul. 18, 2023

(54) THERMOPLASTIC PAVEMENT MARKING COMPOSITION

(71) Applicant: Ennis-Flint, Inc., Greensboro, NC (US)

(72) Inventors: Govindasamy Paramasivam Rajendran, Garnet Valley, PA (US); Mark Terry, Madison, MS (US); Jeffrey Lee Stricker, Narberth, PA (US)

(73) Assignee: Ennis-Flint, Inc., Greensboro, NC (US)

(*) Notice: Subject to any disclaimer, the term of this patent is extended or adjusted under 35 U.S.C. 154(b) by 713 days.

(21) Appl. No.: 16/580,619

(22) Filed: Sep. 24, 2019

(65) Prior Publication Data

US 2020/0095739 A1 Mar. 26, 2020

Related U.S. Application Data

(60) Provisional application No. 62/736,117, filed on Sep. 25, 2018.

(51) Int. Cl.

| | | |
|---|---|---|
| *C08L 23/06* | (2006.01) | |
| *C08K 5/00* | (2006.01) | |
| *C08K 5/01* | (2006.01) | |
| *C08K 3/34* | (2006.01) | |
| *C08J 7/12* | (2006.01) | |
| *E01F 9/506* | (2016.01) | |
| *C08K 5/10* | (2006.01) | |
| *C08K 3/40* | (2006.01) | |
| *B29B 9/12* | (2006.01) | |
| *B29B 13/02* | (2006.01) | |
| *C08K 3/013* | (2018.01) | |

(52) U.S. Cl.
CPC .............. *E01F 9/506* (2016.02); *B29B 9/12* (2013.01); *B29B 13/022* (2013.01); *C08J 7/12* (2013.01); *C08K 3/013* (2018.01); *C08K 3/346* (2013.01); *C08K 3/40* (2013.01); *C08K 5/0016* (2013.01); *C08K 5/01* (2013.01); *C08K 5/10* (2013.01); *C08L 23/06* (2013.01); *B29B 2009/125* (2013.01)

(58) Field of Classification Search
CPC .. C08L 23/06; C08K 5/00; C08K 5/01; C08K 3/34; C08J 7/12

USPC .......................................................... 523/172
See application file for complete search history.

(56) References Cited

U.S. PATENT DOCUMENTS

| | | |
|---|---|---|
| 9,080,296 B2 | 7/2015 | Teng et al. |
| 9,951,486 B2 | 4/2018 | Hepler et al. |
| 2003/0070579 A1* | 4/2003 | Hong ............. C09J 7/22 106/31.04 |
| 2015/0140294 A1 | 5/2015 | Yakopson et al. |
| 2016/0024338 A1* | 1/2016 | Puffer, Sr. ......... C09D 167/08 523/172 |
| 2016/0060829 A1 | 3/2016 | Greer |
| 2017/0158866 A1 | 6/2017 | Nguyen et al. |
| 2018/0142435 A1 | 5/2018 | Greer et al. |

FOREIGN PATENT DOCUMENTS

| | | |
|---|---|---|
| EP | 3201396 A1 | 8/2017 |
| WO | 2016081078 A1 | 5/2016 |
| WO | 2016205382 A1 | 12/2016 |
| WO | 20160205382 A1 | 12/2016 |
| WO | WO-2016205382 A1 * | 12/2016 ............. C08L 93/04 |
| WO | 20180156348 A1 | 8/2018 |

OTHER PUBLICATIONS

"Organoclay-Based Additive for Paintwork Materials" by Petukhova N.A. et al., Ponte International Scientific Research Journal, vol. 73, No. 1, Jan. 1, 2017.
International Search Report for PCT/US2019/052905 dated Dec. 19, 2019.
Written Opinion of the International Searching Authority for PCT/US2019/052905 dated Dec. 19, 2019.

* cited by examiner

*Primary Examiner* — Deve V Hall
(74) *Attorney, Agent, or Firm* — Kilpatrick Townsend & Stockton LLP

(57) ABSTRACT

A pelletized road marking composition includes a binder mixture, a filler mixture and bentonite clay. The binder mixture includes at least one alkyd ester, at least one wax, at least one ethylene copolymer, and at least one plasticizer. The filler mixture includes at least one coloring additive, reflective elements, and at least one inert inorganic filler. The components of the road marking composition are mixed and melted and processed into pellets. The bentonite clay added to the composition prevents the pellets from clumping when stored at elevated temperatures.

18 Claims, No Drawings

THERMOPLASTIC PAVEMENT MARKING COMPOSITION

CROSS-REFERENCE TO RELATED APPLICATIONS

This patent application claims the benefit of priority to U.S. Provisional Patent Application Ser. No. 62/736,117, filed on Sep. 25, 2018, the entire contents of which are incorporated herein by reference.

BACKGROUND OF THE INVENTION

Field of the Invention

The present invention relates to a thermoplastic pavement marking composition and more particularly to a pelletized thermoplastic pavement marking composition having improved anti-clumping properties.

Description of Related Art

Pavement markings such as paints, tapes etc, guide and direct motorists and pedestrians travelling along roadways and paths. Paint, a preferred pavement marking for many years, is now replaced with liquid pavement materials with increased visibility, retro-reflectivity, improved durability, cost and overall performance. One of the liquid pavement marking materials is a non-reactive thermoplastic polymeric composition with an appropriate amount of glass beads, colorants, and inexpensive fillers that is applied as a melt. Light reflective glass beads are provided on top of the thermoplastic melt to achieve the desired performance. By incorporating the glass beads in the thermoplastic composition, the whole marking becomes a retro-reflective material. No significant loss in retroreflectivity is observed due to the wear of the markings as is commonly observed with paints.

Thermoplastic pavement marking compositions are available in particulate and pellet forms. The pellet form of thermoplastic composition is free flowing, melts faster than the powder form, and increases the striping time in a given day of marking. Moreover, the pellet form achieves about 10% higher yield for the same amount of marking material. Additionally, the pellet form is relatively dust-free and significantly reduces the hazards associated with handling powders.

The pellet form of thermoplastic pavement marking composition is formed by mixing together binder and filler mixtures, heating the mixed ingredients into a homogeneous molten mass, and extruding the molten mass. The extruded mass cut into individual pellets and cooled. The pellets are packaged in small polyethylene bags, which are assembled in a pallet to hold one-ton material, or in a super sack to hold one-ton material for storage and transportation.

The thermoplastic pellets packaged in the bags or super sacks form "clumps" or "blocks" when in hot weather on storage or during transportation. The pellets generally do not clump on storage in cold weather. At elevated temperatures, the pellets become sticky and bond with other pellets to form "clumps". At higher storage temperatures, the "clumping" becomes more severe and the clumped pellets form hard "blocks". The blocks float on the thermoplastic melt and require more time to melt completely, thereby affecting road marking productivity. Thus, the advantage gained using the thermoplastic pellets over the powder form of thermoplastic pavement marking material is lost in the tendency of the pellets to form "blocks" on storage and transportation in hot weather days.

The pellets of the thermoplastic composition made using melt mixing of the ingredients in a conventional extruder form cakes or blocks of varying sizes when stored in hot atmospheric condition for extended periods. The cake has to be broken up into small sizes for quicker melting so that it can be applied as a hot pavement marking. The broken pieces of the cake float on the thermoplastic melt and take considerably longer to melt than the pelletized form of the thermoplastic composition.

The formed pellets can be coated with material such as waxes, silanes, silicones, calcium carbonate and with other inorganic fine particulate materials to reduce the clumping as shown in Published Application No. US 2017/0158866 A1. This is a surface coating on the pellet which requires an additional step in the manufacturing process and adds costs to the production. Moreover, such coatings have a potential for creating dust, necessitating special handling and additional cleanup costs. The effectiveness of the coating to prevent clumping depends on the uniform coverage of the coating on the pellet and the extent of adherence of the coating material to the pellet to sustain the attrition of the pellets during packaging and transportation.

Various clays are used in the production of thermoplastic roadway marking compositions. For instance, U.S. Pat. Nos. 9,080,296; 9,951,486; European Patent No. 3201396; US Published Application No. 2015/0140294; and US Published Application No. 2018/0142435 disclose the use of calcined clay as part of an aggregate used in an intermix as part of a thermoplastic marking composition. However, the use of calcined clay does not provide any anti-clumping properties to the thermoplastic composition. Bentonite clay has been used as a viscosity modifier as shown in WO 2016/205382. However, as disclosed in U.S. Pat. No. 9,266,088, bentonite clay enhances the self-clumping properties of aggregate materials.

SUMMARY OF THE INVENTION

The present invention discloses a thermoplastic pavement marking composition, which reduces clumping of pellets on long-term storage under hot and humid conditions or under any use conditions. The thermoplastic pavement marking composition includes organic modified bentonite clay. The addition of bentonite clay provides improved physical characteristics and results in a highly durable and resistant pavement marking that allows the storage of the thermoplastic pellets in any atmospheric condition, including the hot weather experienced in the summer as well as the weather found in tropical and semi-tropical around the world.

Conventional thermoplastic pavement marking compositions usually comprise an alkyd resin derived from pine trees or a thermoplastic resin based on C5 hydrocarbon resins as the main ingredient in the binder. In addition, the thermoplastic binder also contains a plasticizer, an ethylene copolymer and polyethylene wax in smaller quantities. The thermoplastic marking composition also contains coloring additives, both organic and inorganic, and inert fillers like calcium carbonate and reflective glass beads. These inorganic additives constitute the major portion of the pavement marking.

For efficient pavement marking operation, there is a need to reduce or eliminate the tendency of the pellets to clump and form cakes under hot storage or transportation conditions. Changes in the nature or the amount of thermoplastic binder components or the fillers do not result in a composition free from pellet clumping or caking. It has been surprisingly found that the addition of a small amount of a specific clay, organic modified bentonite clay, considerably reduces the clumping tendency of the thermoplastic pellets. This special clay has no substantial effect on the other properties required for the thermoplastic pavement material, as described in AASHTO Designation, T250-05 (2009). The commonly used clays, calcined clays or any other additive do not reduce pellet clumping in the thermoplastic striping composition.

DETAILED DESCRIPTION OF THE INVENTION

While the present invention will be described with reference to preferred embodiments, it will be understood by those who are skilled in the art that various changes may be made and equivalents may be substituted for elements thereof without departing from the scope of the invention. In addition, many modifications may be made to adapt a particular situation or material to the teachings of the invention without departing from the essential scope thereof. It is therefore intended that the present invention not be limited to the particular embodiments disclosed as the best mode contemplated for carrying out this invention, but that the invention will include all embodiments and legal equivalents thereof which are within the scope of the appended claims.

The present invention is a pelletized thermoplastic road marking composition that is specially designed to minimize clumping of the pellets when exposed to hot storage conditions. The thermoplastic road marking composition is formed from a mixture of thermoplastic binders, inorganic fillers, and bentonite clay. The thermoplastic binder includes an alkyd resin, a plasticizer, ethylene copolymer (EVA), and polyethylene wax. The filler includes titanium dioxide, calcium carbonate, and retroreflective glass beads. It has been found that the bentonite clay added to the thermoplastic road marking composition minimizes the clumping of the pellets.

Suitable alkyd resins include rosin resin, which is comprised of one or more components consisting of modified rosin resins and rosin esters. Modified rosin resins are comprised of one or more components consisting of rosin acids, maleic anhydride and fumaric acid. Rosin acid is derived from pine trees as gum rosin, wood rosin and tall oil rosin. Rosin esters are comprised of one or more derivatives obtained from the reaction of one or more rosin acids and one or more alcohol from the group of alcohols consisting of methanol, triethylene glycol, glycerol and penta-erythritol.

Suitable plasticizers include vegetable oils and phthalates. Vegetable oils are the reaction products of the fatty acids with glycerol, commonly referred to as triglycerides; castor oil is a typical example. Phthalates are comprised of one or more components from a group of esters such as dimethyl phthalate, diethyl phthalate, dibutyl phthalate, dicyclohexyl phthalate, butyl(2-ethylhexyl) phthalate and similar such phthalate ester compounds.

The waxes used in the thermoplastic composition include petroleum-derived waxes and synthetic waxes. The petroleum-derived waxes are comprised of one or more member selected from the group containing saturated n-alkanes, iso-alkanes, naphthenes, alkyl substituted aromatic compounds, and naphthene substituted aromatic compounds. Synthetic waxes can be polyethylene, Fischer-Tropsch waxes, chemically modified waxes or amide-modified waxes. Polyethylene waxes generally have the chemical formula $C_2H_4)_nH_2$ and can have either linear chain or branched structures. The waxes can be based on ultra-high molecular weight polyethylene (UHMWPE) high-density polyethylene (HDPE), medium density polyethylene, linear low-density polyethylene (LLDPE), low-density polyethylene (LDPE) and very low density polyethylene (VLDPE). Fischer-Tropsch waxes generally have the chemical formula $C_nH_{(2n+2)}$. Chemically modified waxes are converted from non-polar to polar molecules by the incorporation of functional groups such as hydroxyl, carboxyl, a salt, an ester and an acid group. Amide modified waxes have amide functional molecules grafted to the polyethylene chain to modify flexibility or adhesion or compatibility with other binder components.

Ethylene copolymer is included in the thermoplastic composition to improve the flexibility, durability and flow modification of the pavement materials. Suitable examples include ethylene vinyl acetate copolymers, ethylene acrylate copolymers, ethylene methacrylate copolymers, ethylene acrylate glycidyl-acrylate copolymers. The amount of ethylene unit can range from 50% to 95% by weight and the remaining the other monomer in the copolymer. The preferred copolymer is ethylene-vinyl acetate. The vinyl acetate content can vary from 2% to 30% by weight in the copolymer.

The compositions of this invention can comprise one or more fillers. Useful fillers are typically solids that are non-reactive with the other components of the compositions of this invention. The fillers constitute the major portion of the composition, comprising 70% to 85% by weight of the total composition. Useful fillers include clay, talc, glass particles and beads, metal oxide and sulfate particulates, ceramic microspheres, hollow polymeric or glass microspheres, carbonates, silica and aluminum trihydrate.

The filler can include coloring pigments. Rutile titanium dioxide with a minimum purity of 92% is usually used for white materials and a combination of titanium oxide and organic or heavy metals free pigments is usually used for yellow materials. Barium sulfate or zinc oxide can also be used in place of titanium oxide in these compositions.

The filler can also include ground calcium carbonate or magnesium carbonate with or without organic surface treatment. The particle size of these carbonates is selected based on the required flow characteristics of the thermoplastic composition.

A glass fill can be used as a filler to provide viscosity modification.

The particular glass beads used in the filler depend on the applicable governmental requirement for the size, quality, amount and retro-reflectivity. The glass beads provide continuous retro-reflectivity for extended periods compared to the paint based marking materials. As the marking materials wear, the glass beads in the composition are exposed, providing continued visibility for road markings.

Bentonite clay is a special type of absorbent aluminum phyllosilicate, consisting mostly of montmorillonite. This clay has platelet morphology, with interstitial cations present in between the individual platelets. The usual cations are sodium, potassium and calcium. These clays swell in water to form colloidal dispersions. The property of swelling makes this clay useful as sealant, absorbent for organic materials, drilling mud for gas and oil exploration. This clay is modified with cationic organic surfactants to make it hydrophobic. The organic modified bentonites are used as additives in polymers to modify the mechanical and rheological properties. The organic modified bentonite clays are available commercially from BYK Additives Inc. (Gonzales, Tex.) and others.

Preferably, the bentonite clay is compounded with the EVA or with the EVA and alkyd resin in the front end of an extruder. This combination is then compounded with the rest of the binder resin components and fillers to form a thermoplastic composition. The entire composition is extruded into a homogeneous molten mass, cooled down and cut into pellets.

Preferably, the concentration of the bentonite clay is in the range of 0.01 to 5 weight percent of the thermoplastic composition, and more preferably in the range of 0.1 to 2 weight percent of the thermoplastic composition, and more preferably in the range of 0.5 to 1 weight percent of the thermoplastic composition.

Because the bentonite clay minimizes the potential clumping of the pellets, there is no need to apply a calcium carbonate or other coating.

Without being bound to any particular theory, it is believed that the bentonite clay disperses in the binder resin in an "exfoliated" mode, which increases the melt viscosity and reduces the resin flow. Additionally the nanometer thick clay sheets act as a diffusion barrier for the resin flow. The reduced resin flow eliminates pellets clumping under hot storage conditions.

The present invention improves on the prior art coated pellets in other respects. The compositions made using this invention will eliminate the need to apply $CaCO_3$ or other coatings after making the pellets. Thus, the present invention reduces the investment and operational costs for making the pellets. Moreover, the new composition will be dust-free, a feature much desired by the manufactures and the consumers. Finally, the invention permits the creation of a sizable inventory without concern to the storage condition at the plant or customer's facility or any abuse to the pellets during transportation.

Experiment 1

Table 1 lists the ingredients for the preparation of the pellets used in the examples presented below.

TABLE 1

| Material description |
| --- |
| Alkyd resin |
| Plasticizer and copolymer |
| Titanium dioxide |
| Calcium carbonate |
| Glass beads |
| Clay |
| Calcined clay |
| Bentonite clay |

AASHTO M249, T250 and California Department of Transportation (CALTRANS) test methods were used to characterize the thermoplastic compositions made using the ingredients in the given examples.

The softening point of thermoplastic composition was measured using a ring and ball apparatus using ASTM method D36.

The viscosity of the thermoplastic composition was measured using the CALTRANS method at 400° F. and 425° F. with a SC4-27 spindle. A Thermosel® disposable SC4-27 aluminum spindle and a Thermosel® disposable aluminum chamber were used for this measurement.

The hardness of the thermoplastic composition was measured using a Type A Durometer at 115° F.

The tendency of the thermoplastic pellets composition to clump under weight in hot storage conditions was evaluated using a "clumping" test method developed in-house. This method is a slight variation of another in-house developed method discussed in US Published Application No. US 2017/0158866 A1 to study the clumping of pellets at elevated temperature. A special silicone mold was made to make 1-inch diameter and 0.3 inch thick discs of the thermoplastic compositions. The silicone mold was made by drilling a series of one-inch diameter holes in a 0.3 inch silicone sheet, which was then bonded to another 0.3 inch silicone sheet using room temperature curable silicone adhesive. The discs were made by pouring the thermoplastic composition after heating to 425° F. and pouring the hot melt in the circular cavities in the silicone mold. After the melt cooled down to room temperature, the discs were removed.

The smooth sides of two discs made using the above procedure were placed facing each other on a piece of smooth PVC block. A 2-inch long PVC tube with an inside diameter of 1.2 inches was positioned to keep the discs from sliding against each other during testing. A 2-inch long high-density polyethylene rod having a 1.1 inch diameter was placed on top of the discs assembly so that a half inch rod protrudes above the PVC tube. A 3-pound stainless steel cylinder was placed over the top of the polyethylene rod, so that the whole weight was squarely rested on the top of the discs without touching the PVC tube. The same experimental set up was duplicated three more times to test four sets of discs at the same time. The four test rigs were transferred carefully to an air circulating constant temperature oven maintained at 54° C. (129.2° F.) for 2.5 hours. The rigs were then removed from the oven, allowed to cool to room temperature. The discs bonded to each other strongly at the elevated temperature.

After the rings cooled, ¾ inch aluminum dollies were attached to both sides of the bonded disc pair using Super Glue and cured overnight at room temperature. The dollies were connected to the instron equipped with 1000 pound load cell using quick connects. The dollies were pulled at a 0.2 inches/minute separation rate. The load at which the discs break was noted in pounds. The failure was usually at the interface of the two discs and not at the adhesive phase connecting the dolly and the pellet. The adhesive force measured was converted into force/unit area of the composition. The average of the four measurements was reported as "clump strength" for the particular test condition.

Six thermoplastic compositions were prepared for analysis. A control example was prepared to which no clay was added to the composition. Two comparative examples were also prepared. Comparative Example 1 was modeled on the Control Example with 0.60 wt. % regular clay being added to the composition. Comparative Example 2 was modeled on the Control Example with 0.60 wt. % calcined clay being added to the composition.

Three examples were also prepared based on the current invention. Example 1 was modeled on the Control Example with 0.20 wt. % bentonite clay being added to the composition. Example 2 was modeled on the Control Example with 0.40 wt. % bentonite clay being added to the composition. Example 3 was modeled on the Control Example with 0.60 wt. % bentonite clay being added to the composition.

The compositions of the Control Example, both Comparative Examples and all 3 Examples of the invention are presented in Table 2 below.

TABLE 2

| Ingredients | Control Example | Comparative Example 1 | Comparative Example 2 | Example 1 | Example 2 | Example 3 |
|---|---|---|---|---|---|---|
| Maleic anhydride modified ester resin | 18.26 | 18.26 | 18.26 | 18.26 | 18.26 | 18.26 |
| Plasticizer and copolymer | 8.24 | 8.24 | 8.24 | 8.24 | 8.24 | 8.24 |
| Titanium dioxide | 10.00 | 10.00 | 10.00 | 10.00 | 10.00 | 10.00 |
| Calcium carbonate | 26.00 | 26.00 | 26.00 | 26.00 | 26.00 | 26.00 |
| Glass beads | 37.50 | 36.90 | 36.90 | 37.30 | 37.10 | 36.90 |
| Clay | None | 0.60 Regular clay | 0.60 Calcined clay | 0.20 Bentonite clay | 0.40 Bentonite clay | 0.60 bentonite clay |

The properties of each of the 6 compositions were measured using the procedures outlined above. The results of those measurements are presented in Table 3 below:

TABLE 3

| Properties | Control Example | Comparative Example 1 | Comparative Example 2 | Example 1 | Example 2 | Example 3 |
|---|---|---|---|---|---|---|
| Softening point (° F.) | 229 | 229 | 229 | 230 | 231 | 232 |
| Melt viscosity At 400° F. | | | | | | |
| 60 rpm | 2883 | 2954 | 2850 | 2983 | 3458 | 3821 |
| 30 rpm | 3467 | 3625 | 3667 | 3558 | 4200 | 4767 |
| 12 rpm | 4813 | 5854 | 5583 | 5500 | 6146 | 7188 |
| 6 rpm | 6708 | 9083 | 8375 | 7458 | 8625 | 10292 |
| At 425° F. | | | | | | |
| 20 rpm | 3500 | 3550 | 3638 | 3813 | 4262 | 4912 |
| Hardness | 68 | 70 | 72 | 82 | 88 | 85 |
| Clump strength (psi) | | | | | | |
| At 45° C. | 21.1 | 20.4 | 20.7 | 18.2 | 20.3 | 20.7 |
| At 54° C. | 151.9 | 146.1 | 142.6 | 77.0 | 49.2 | 47.9 |

The addition of bentonite clay in small quantities does not affect the softening point of the thermoplastic composition. The bentonite clay increased the melt viscosity and hardness of these compositions. Unexpectedly the "clump strength" at higher temperatures decreased substantially with the addition of a small amount of bentonite clay in the thermoplastic compositions. Notably, the clump strength did not decrease when adding regular clay or calcined clay to the composition. This reduction in the "clump strength" demonstrates that the thermoplastic pellets containing bentonite clay will have an improved resistance to clumping as compared with standard pellets and pellets containing other clays.

Experiment 2

In a further experiment, a thermoplastic composition containing bentonite clay but no other viscosity modifiers was compared with a thermoplastic composition without bentonite but containing other viscosity modifiers. The bentonite not only improves resistance to pellet clumping, but it also modifies the melt viscosity profile and prohibits settling of the glass beads and fillers at the striping application temperature.

The tendency for a given formulation to prohibit bead/filler settling was evaluated by allowing the melts from Experiment 2 to cool, undisturbed, in the aluminum viscosity thimbles immediately after measuring their melt viscosity profiles. Once the thimbles were cooled to room temperature, the thimble was bisected into a top and bottom portion with a diamond saw. Each top and bottom portion of the thermoplastic sample was removed and evaluated for binder content and glass bead and filler content according to AASHTO test method T250. The difference in the amount of glass beads and filler between the top and bottom portions of the bisected samples is a direct measurement of the ability of the formulation to prevent bead and filler settling. Table 4 below summarizes the improved performance for formulations containing bentonite.

TABLE 4

| Ingredients | Control Composition with glass-fill | Composition with glass-fill and no bentonite and no other viscosity modifiers | Composition with glass-fill and bentonite and no other viscosity modifiers |
|---|---|---|---|
| Maleic anhydride modified ester resin | 14.86 | 18.86 | 18.86 |
| Plasticizer + co-polymer | 5.94 | 1.94 | 1.94 |
| Bentonite | 0 | 0 | 0.5 |

TABLE 4-continued

| Ingredients | Control Composition with glass-fill | Composition with glass-fill and no bentonite and no other viscosity modifiers | Composition with glass-fill and bentonite and no other viscosity modifiers |
|---|---|---|---|
| TiO$_2$ | 10 | 10 | 10 |
| CaCO$_3$ filler | 1.5 | 1.5 | 1.5 |
| Glass beads | 32.5 | 32.5 | 32.5 |
| Glass fill | 35.2 | 35.2 | 34.7 |
| Melt viscosity at 400° F. | | | |
| 60 rpm | EEEE | EEEE | EEEE |
| 30 rpm | 6683 | 7908 | EEEE |
| 12 rpm | 8979 | 8854 | 9417 |
| 6 rpm | 12500 | 10042 | 11125 |
| at 425° F. | | | |
| 20 rpm | 5887 | 4787 | 5500 |
| 10 rpm | 8150 | 6300 | 7025 |
| As Formulated | | | |
| Binder | 20.80% | 20.80% | 20.80% |
| Glass beads | 32.5% | 32.5% | 32.5% |
| Glass fill | 35.2% | 35.2% | 34.70% |
| Binder content % as measured | | | |
| Bottom half | 17.64 | 16.99 | 18.44 |
| Top half | 22.14 | 21.81 | 21.83 |
| Glass beads/glass-fill as measured | | | |
| Bottom half | 66.46 | 67.13 | 61.37 |
| Top half | 58.06 | 56.23 | 56.17 |
| Glass bead/glass-fill settling (bottom-top) | 8.4 | 10.9 | 5.2 |

The use of bentonite in the formulation of Experiment 2 results in an improved thermoplastic product with an increased resistance to filler and/or glass bead settling, as compared to the control composition. The control composition, which contains viscosity modifiers but no bentonite, also performs much better than a formulation with no viscosity modifiers. The formulations from Experiment 2 and similar formulations can be produced as a powdered or pelletized product.

Various modifications and alterations to this invention will become apparent to those skilled in the art. The amount of bentonite in the thermoplastic composition can be adjusted to modify the "clump" force, suitable to avoid clumping of the pellets in any adverse storage conditions.

While the above description contains certain specifics, these should not be construed as limitations on the scope of the invention, but rather as an exemplification of one preferred embodiment thereof. Accordingly, the scope of the present invention should be determined not by the embodiment(s) illustrated, but by the appended claims and their legal equivalents.

What is claimed:

1. A road marking composition comprising:
   a binder mixture comprising an alkyd ester, a wax, an ethylene copolymer, and a plasticizer;
   a filler mixture comprising a coloring additive, reflective elements, and an inorganic filler; and
   bentonite clay therein,
   said road marking composition formed into pellets.

2. The composition of claim 1, wherein said bentonite clay is an organic modified bentonite.

3. The composition of claim 1, wherein the amount of said bentonite clay in said composition ranges from 0.01 to 5.0 percent by weight.

4. The composition of claim 3, wherein the amount of said bentonite clay in said composition ranges from 0.1 to 2.0 percent by weight.

5. The composition of claim 1 further comprising a glass fill viscosity modifier.

6. The composition of claim 5, wherein the amount of said glass fill is in the range of 25 to 40 percent by weight.

7. A method for manufacturing the road marking composition of claim 1 comprising the steps of:
   heating a mixture of the binder mixture, the bentonite clay, and the filler mixture to form a molten composition;
   processing said molten composition into a plurality of pellets; and
   cooling and drying the plurality of pellets.

8. The method of claim 7, wherein said bentonite clay is an organic modified bentonite.

9. The method of claim 7, wherein the amount of said bentonite clay in said composition ranges from 0.01 to 5.0 percent by weight.

10. The method of claim 9, wherein the amount of said bentonite clay in said composition ranges from 0.1 to 2.0 percent by weight.

11. The method of claim 7 further comprising the step of adding a glass fill viscosity modifier before heating said thermoplastic composition.

12. The method of claim 11, wherein the amount of said glass fill is in the range of 25 to 40 percent by weight.

13. The composition of claim 1, wherein the ethylene copolymer comprises ethylene vinyl acetate.

14. The composition of claim 1, wherein the ethylene copolymer comprises one or more of ethylene vinyl acetate copolymers, ethylene acrylate copolymers, ethylene methacrylate copolymers, ethylene acrylate glycidyl-acrylate copolymers.

15. The composition of claim 1, wherein the ethylene unit of the ethylene copolymer ranges from 50 to 95 percent by weight of the total ethylene copolymer.

16. The composition of claim 1, wherein the road marking composition formed into pellets does not include a calcium carbonate coating.

17. The composition of claim 1, wherein the composition comprises a clump strength of at least 82 psi.

18. The composition of claim 3, wherein the amount of said bentonite clay in said composition ranges from 0.5 to 1.0 percent by weight.

* * * * *